United States Patent
Klausz

(10) Patent No.: US 7,430,281 B2
(45) Date of Patent: Sep. 30, 2008

(54) ANTI-SCATTER GRID WITH MECHANICAL RESISTANCE

(75) Inventor: Rémy André Klausz, Neuilly sur Seine (FR)

(73) Assignee: GE Medical Systems Global Technology Co. LLC, Waukesha, WI (US)

( * ) Notice: Subject to any disclaimer, the term of this patent is extended or adjusted under 35 U.S.C. 154(b) by 0 days.

(21) Appl. No.: 10/842,081

(22) Filed: May 10, 2004

(65) Prior Publication Data

US 2004/0234036 A1    Nov. 25, 2004

(30) Foreign Application Priority Data

May 22, 2003    (FR) .................................. 03 06139

(51) Int. Cl.
*G21K 1/00* (2006.01)

(52) U.S. Cl. ...................................... 378/154; 378/145

(58) Field of Classification Search .............. 378/154, 378/155, 145
See application file for complete search history.

(56) References Cited

U.S. PATENT DOCUMENTS

| 4,706,269 | A | | 11/1987 | Antolik et al. | |
|---|---|---|---|---|---|
| 4,951,305 | A | | 8/1990 | Moore et al. | |
| 5,418,833 | A | * | 5/1995 | Logan | 378/154 |
| 5,581,592 | A | * | 12/1996 | Zarnoch et al. | 378/154 |
| 5,652,781 | A | * | 7/1997 | Armbruster et al. | 378/182 |
| 5,814,235 | A | * | 9/1998 | Pellegrino et al. | 216/12 |
| 5,931,354 | A | * | 8/1999 | Braud et al. | 222/394 |
| 6,181,772 | B1 | | 1/2001 | Reina et al. | |
| 6,408,054 | B1 | * | 6/2002 | Rahn et al. | 378/154 |
| 6,807,252 | B1 | * | 10/2004 | Dobbs | 378/154 |
| 2001/0050973 | A1 | * | 12/2001 | Ogawa | 378/154 |
| 2002/0090055 | A1 | * | 7/2002 | Zur et al. | 378/154 |
| 2003/0021379 | A1 | * | 1/2003 | Klotz et al. | 378/154 |
| 2003/0072415 | A1 | * | 4/2003 | Eidam et al. | 378/154 |
| 2003/0081731 | A1 | * | 5/2003 | Souchay et al. | 378/154 |

FOREIGN PATENT DOCUMENTS

GB    557 121 A    11/1943

OTHER PUBLICATIONS

"Ultem / Polyether-imide", Parkway Products, Inc., Feb. 22, 2001 [online], Retrieved from the Internet: <URL:http://www.parkwayproducts.com/ultem-polyether-imide_print.htm>.*

* cited by examiner

*Primary Examiner*—Chih-Cheng G Kao
(74) *Attorney, Agent, or Firm*—GE Global Patent Operation; Jonathan E. Thomas

(57) ABSTRACT

An anti-scatter grid for radiology imaging having an anti-scatter layer with a plurality of metallized partitions that enable X-rays emitted from a source located above the grid to pass and absorbing X-rays not derived directly from this source. The grid has at least one plate of expanded polymer material fixed on one surface of anti-scatter layer. The grid may be positioned with a frame.

38 Claims, 3 Drawing Sheets

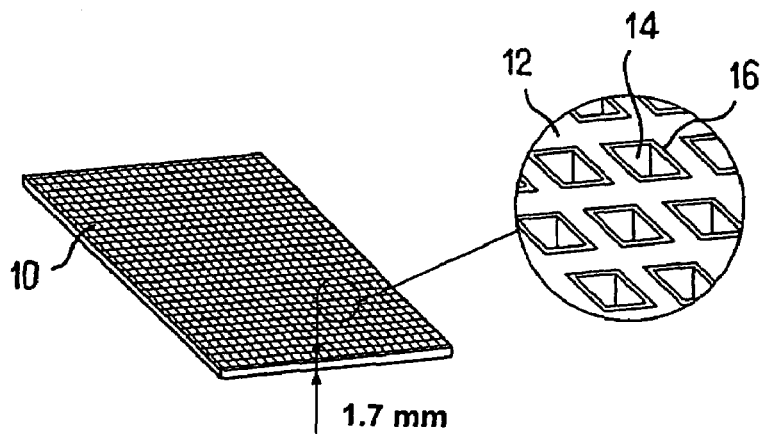
FIG_1
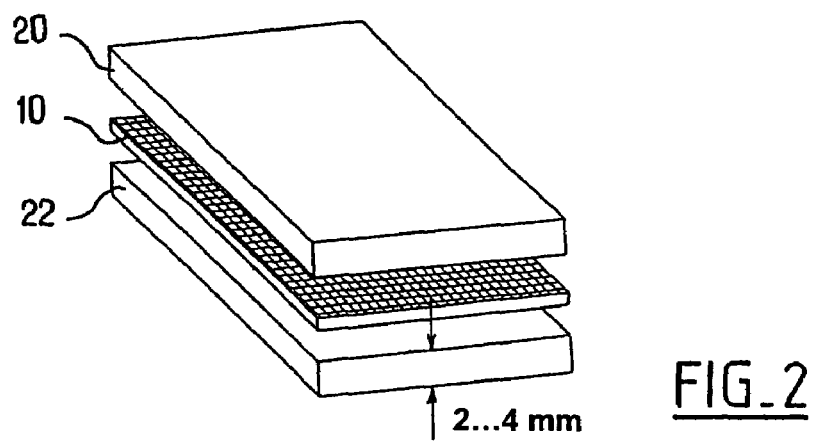
FIG_2
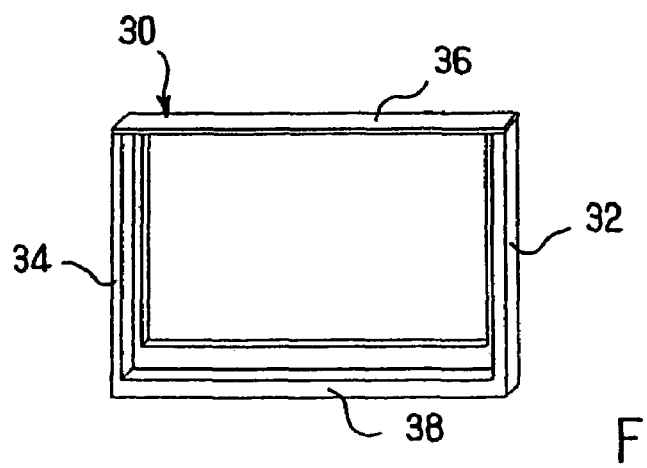
FIG_3

ANTI-SCATTER GRID WITH MECHANICAL RESISTANCE

CROSS-REFERENCE TO RELATED APPLICATIONS

This application claims the benefit of a priority under 35 SC 119(a)-(d) to French Patent Application No. 03 06139 filed May 22, 2003, the entire contents of which are hereby incorporated by reference.

BACKGROUND OF THE INVENTION

The invention concerns anti-scatter grids as used in radiology imaging and particularly in X-ray imaging.

A radiology imaging apparatus conventionally comprises a source of radiation, such as an X-ray source, and a means for forming the image, such as an image receptor, between which the object to be imaged is positioned. The beam of radiation emitted by the source passes through the object before reaching the receptor. It is partly absorbed by the inner structure of the object so that the intensity of the beam received by the receptor is attenuated. The global attenuation of the beam after passing through the object is directly related to absorption distribution within the object.

The image receptor comprises an optoelectronic detector or intensifying screen-film couple, sensitive to radiation intensity. Consequently, the image generated by the receptor corresponds in principle to the distribution of global ray attenuation subsequent to passing through inner structures of the object.

Part of the radiation emitted by the source is absorbed by the inner structure of the object, the other part is either transmitted (primary or direct radiation) or scattered (secondary or scatter radiation). The presence of scatter radiation leads to degradation of contrast in the image obtained and a reduced signal to noise ratio. This is of particular hindrance, in particular if it is desired to visualize details of the object.

One solution to this problem comprises inserting an "anti-scatter" grid between the object to be X-rayed and the image receptor. These grids are usually formed of a series of parallel strips or partitions of X-ray absorbing material. In so-called "focalized" grids (according to the terminology laid down by standard IEC 60627 on "X-ray imaging diagnostic equipment—Characteristics of anti-scatter grids for general use and mammography screening") all the planes of the strips or partitions are oriented along planes passing through the focal point of radiation emitted by the source. Therefore, these grids allow direct radiation to pass and absorb scatter radiation. Focalized anti-scatter grids have contributed towards a considerable improvement in the contrast of images obtained.

In order to obtain good quality images it is desirable to provide grids having the finest possible structure so as not to disturb direct radiation. It is also desirable to control the orientation of the absorbing strips or partitions with precision. The precision with which the strips or partitions are orientated evidently depends upon the manufacturing technique used to produce the grid. However, it is found that during use of the grid it may undergo deformation, which substantially modifies strip orientation. The consequence is impaired precision of strip or partition orientation. This impairment is greater the narrower the thickness of the grid and its propensity to deform.

This problem is particularly raised in imaging devices with an overhanging grid, i.e., fixed on one side only. In this case it may undergo substantial bending stresses.

To overcome these disadvantages, grids have been proposed having an aluminium frame, the frame giving rigidity to the assembly. In addition, these grids are coated on each of their surfaces with plates in a composite carbon and resin material having a thickness of between 0.2 and 0.4 mm.

BRIEF DESCRIPTION OF THE INVENTION

An embodiment of the invention is directed to an anti-scatter grid comprising an anti-scatter layer having a plurality of metallized partitions, these partitions allowing radiation that are emitted from a source located above the grid to pass and absorbing those radiation which do not derive directly from this source and at least one plate in an expanded polymer material fixed to one surface of the anti-scatter layer.

An embodiment of the invention also directed to a method for fabricating an anti-scatter grid comprising:

forming an anti-scatter layer having a plurality of metallized partitions, these partitions enabling radiation to pass emitted by a source located over the grid and absorbing those radiation which do not derive directly from this source; and fixing at least one plate of expanded polymer material on one surface of the anti-scatter layer.

BRIEF DESCRIPTION OF THE DRAWINGS

The invention and embodiments thereof will be better understood from the following description that is solely illustrative and non-restrictive and is to be read with reference to the appended figures in which:

FIG. 1 is a schematic view of an anti-scatter layer of a focalized grid;

FIG. 2 is a schematic view of the layers forming an anti-scatter grid according to an embodiment of the invention;

FIG. 3 is a schematic view of a frame intended to hold the grid-forming layers;

DETAILED DESCRIPTION OF THE INVENTION

Figure 4:
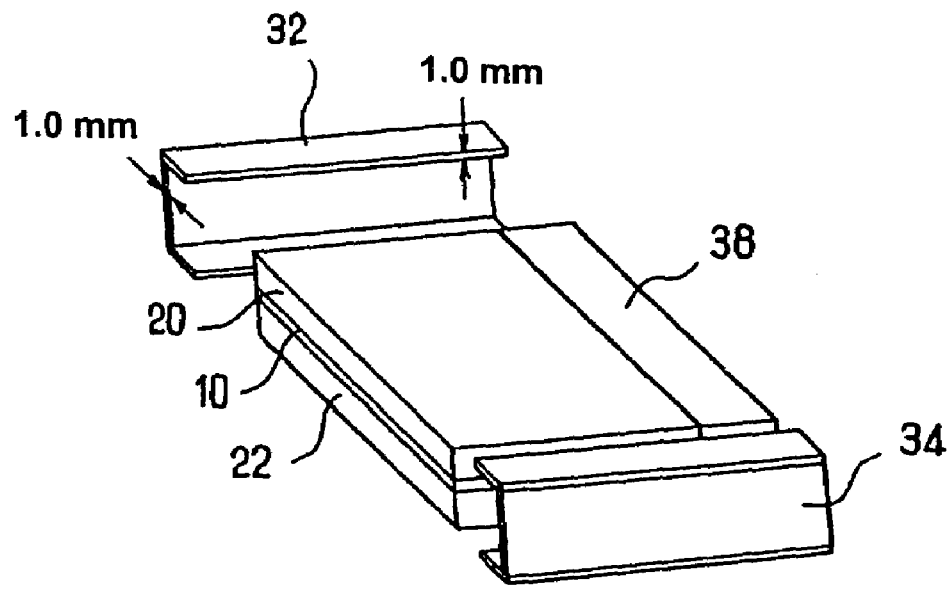
FIG. 4 is a schematic view of the positioning of two side parts of the frame.

In FIG. 1 anti-scatter layer 10 is formed of a planar substrate 12 of a polymer material, approximately 1 to 3 mm thick, comprising partitions defining cells 14. As shown in FIG. 1, the thickness can typically be 1.7 mm. The inner walls of cells 14 are coated with an absorbing metal layer 16. Anti-scatter layer 10 is focalized, which means that the cell walls are oriented along planes passing through the focal point of radiation emitted by a source of radiation.

As a result of the anti-scatter layer 10, part of the direct radiation emitted by an X-ray source passes through the grid via substrate 12 while another part passes through the layer via cells 14. On account of the low density of the polymer forming substrate 12, the radiation passing through it is scarcely attenuated.

The inner walls of cells 14 coated with a metal layer 16 absorb scatter radiation arriving at anti-scatter layer 10 at too great an angle relative to the direction of focalization of one of cells 14.

In FIG. 2, two plates 20 and 22 of expanded polymer material are arranged on each surface of anti-scatter layer 10. The polymer material forming the plate should have sufficient rigidity to prevent grid deformation and sufficient homogeneity so as not to disturb the X-ray image through artifacts. Expanded polymer materials have the advantage of scarcely attenuating X-rays on account of their low surface density. The plate of expanded material also plays a protective role for the anti-scatter layer of the grid.

Both plates 20 and 22 may be formed of a hard polymethacrylimide (PMI) foam. This type of foam is manufactured, for example, by RÖHM GmbH under the trademark ROHACELL® or an expanded polyetherimide (this type of material is supplied for example by ALCAN AIREX AG under the trademark AIREX®). The plate is formed in a material having a density of between 20 and 70 kg/m$^3$. ROHACELL® is available in this density range. In particular a density in the order of 30 kg/m$^3$ is available. The plates may have a thickness between 2 and 6 mm and the two plates may have the same thickness.

Plates 20 and 22, respectively positioned on the surface of anti-scatter layer 10 are intended to be exposed to the rays emitted by the X-ray source, and on the surface of anti-scatter layer 10 located on the image detector side, can be identical. The thickness of the plates is on the order of 3 mm with an approximate density of 30 kg/m$^3$. As shown in FIG. 2, there are two plates 20, 22 with a range of thickness between 2 and 4 mm.

Assembly of plates 20 and 22 of polymethacrylimide is made by bonding. The adhesive is preferably deposited on plates 20 and 22 and these plates are then superimposed on anti-scatter layer 10. The adhesive may be distributed so that it only contacts a peripheral area of anti-scatter layer 10 which does not form an active part of the layer. Therefore the adhesive does not disturb radiation transmission through layer 10 and plates 20 and 22.

Alternately, the adhesive may be placed so that it contacts the entire surfaces of anti-scatter layer 10 which improves the mechanical resistance of the assembly. In this case, an aerosol adhesive is preferred to provide a fine, homogeneous layer of adhesive. This bonding technique avoids filling the cells of the anti-scatter layer.

It is also possible to use a film adhesive. This type of adhesive is in the form of a film with or without a backing that can be deposited directly on a surface of each of plates 20 or 22 so that they can be assembled with anti-scatter layer 10. Adhesive films have the advantage of providing a thin, homogeneous layer of constant thickness and therefore of obtaining constant radiation transmission over the entire assembly surface.

FIGS. 3 and 4 shows a frame 30 intended to be positioned around the assembly formed by the anti-scatter grid. The purpose of frame 10 is to rigidify and to protect the assembly.

Figure 5:
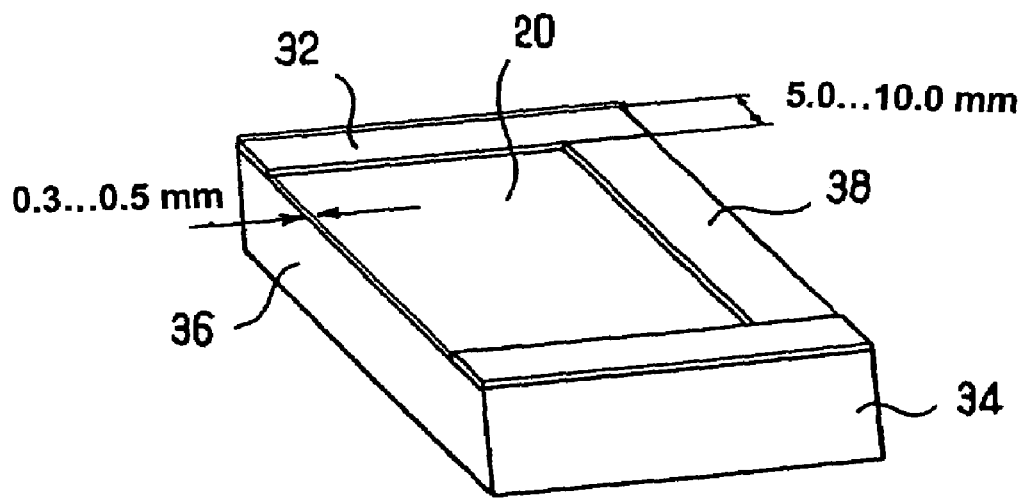
FIG. 5 is a schematic view of the positioning of two other parts finalizing this frame.

In FIG. 4, positioning of the frame comprises a first step in which a crosspiece 38 is positioned on one of the longitudinal sides of the assembly formed by the superimposition of plates 20, 22 and anti-scatter layer 10. The second step in frame positioning comprises placing two U-shaped 32 and 34 sections made of carbon composite material on the two opposite transverse sides of the assembly. The U-shaped sections encase the assembly and crosspiece 38. As shown in FIG. 4, the thickness of the U-shaped portions of the sections 32 and 34 may be approximately 1.0 mm. As shown in FIG. 5, the legs of the U-shaped sections 32 and 34 may be approximately 5.0 to 10. mm.

FIG. 5 shows a third step comprising depositing a fine layer 36 (thickness on the order of 0.3 to 0.5 mm) of carbon composite material on the remaining longitudinal side of the assembly to finalize frame 30.

The anti-scatter grid obtained (FIG. 5) is particularly adapted for mammography screening applications. The longitudinal side coated with fine layer 36 is the side against which the patient leans, and the longitudinal side along which crosspiece 38 extends is the side on which the anti-scatter grid is held in place. With fine layer 36, X-rays passing close to the patients' ribcage are not hindered so as to obtain the most extensive mammography view possible. Crosspiece 38 is intended to fix the anti-scatter grid for a Potter-Bucky device. Crosspiece 38 limits vibrations of the anti-scatter grid should it be placed in movement.

The anti-scatter grid may also comprise one or more protection layers covering one or optionally both plates 20 and 22 of polymethacrylimide. The protection layer may be formed of a polymer material for example, a composite material containing carbon fibers, a lacquer or varnish. The protection layer is intended to protect the expanded polymethacrylimide plate against humidity and impact. The attenuation of X-rays by the protective layer should be the least possible. The protective layer is made of a polymer material for example having a thickness in the order of 0.1 mm that provides an acceptable attenuation of X-rays in the order of 1%.

The protection layer can be a polymer material, preferably a polyester (supplied for example by DUPONT DE NEMOURS under trademark MYLAR®) in polycarbonate (available from RÖHM GmbH for example under trademark EUROPLEX®), or in polymethylmethacrylate PMM (supplied for example by RÖHM GmbH under trademark PLEXIGLASS®).

The protection layer is preferably deposited on a surface of plate 22 oriented in an opposite direction to the X-ray source (i.e., towards the detector). The protective layer protects the grid against possible impacts during handling operations. However, plate 20 oriented towards the source may also be given a protection layer.

In one variant of embodiment of the invention, the assembly may be held in place by a crosspiece and not a frame.

Figure 6:
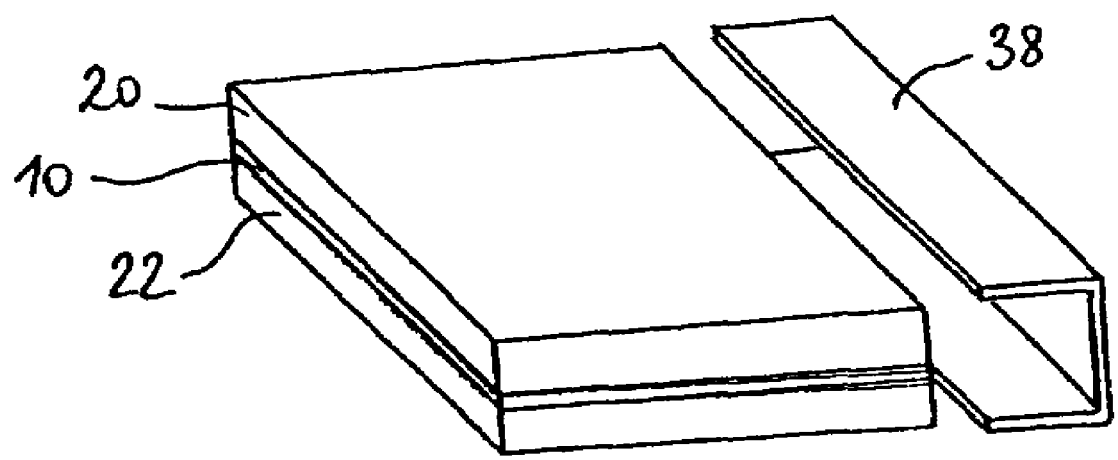
FIG. 6 is a schematic view of a crosspiece intended to hold in place the grid-forming layers.

FIG. 6 shows a crosspiece 38 intended to be positioned on one of the longitudinal sides of the assembly. Crosspiece 38 has a straight generally U-shaped section. The assembly, comprising the two plates 20 and 22 in expanded polymer material and anti-scatter layer 10, is inserted between the two sides of the U. Crosspiece 38 is intended to rigidify and to protect the edge of the assembly. Crosspiece 38 is also used to fix the assembly to a Potter-Bucky. Fixations may be provided for this purpose on crosspiece 38. The grid so fabricated is lighter than the grid in FIG. 5.

The plate of expanded material can rigidify the grid and maintain the anti-scatter layer in its initial form. Expanded materials offer a high bending strength-to-weight ratio. In addition, these materials have low surface density, which means they make practically no contribution towards grid deformation.

One skilled in the art may make or propose various modifications to the structure and/or way and/or function and/or result and/or steps of the disclosed embodiments and equivalents thereof without departing from the scope and extant of the invention.

What is claimed is:

1. An anti-scatter grid useful for X-ray imaging, comprising:
    an anti-scatter layer having a plurality of partitions; and
    at least one plate of expanded polymer material fixed to one surface of the anti-scatter layer, wherein thickness of one of the at least one plate is equal to or greater than thickness of the anti-scatter layer, each plate thickness being defined by a distance between two opposing surfaces of the respective plate that are oriented such that an incident X-ray passes first through one of the surfaces and then through the other surface;

the anti-scatter layer being a polymer substrate with open cells formed therein, inner walls of the open cells layered with an X-ray absorbing metal layer, thereby defining the plurality of partitions;

the anti-scatter layer being disposed such that a part of the incident X-ray passes through the anti-scatter layer via the polymer substrate, while another part of the X-ray passes through the anti-scatter layer via the open cells;

wherein each plate imparts a rigidity to the anti-scatter layer;

wherein each plate has a low surface density that does not substantially attenuate an X-ray that passes therethrough, and has sufficient homogeneity so as not to disturb an X-ray image through artifacts; and wherein the at least one plate consists of two plates of expanded polymer material arranged on opposing surfaces of the anti-scatter layer.

2. The grid according to claim 1 wherein at least one of the plates is in polymethacrylimide foam or expanded polyetherimide.

3. The grid according to claim 1 wherein at least one of the two plates is formed of a material having a density of between 20 and 70 kg/m$^3$.

4. The grid according to claim 2 wherein at least one of the two plates is formed of a material having a density of between 20 and 70 kg/m$^3$.

5. The grid according to claim 1 wherein at least one of the two plates has a thickness of between 2 and 6 mm.

6. The grid according to claim 2 wherein at least one of the two plates has a thickness of between 2 and 6 mm.

7. The grid according to claim 3 wherein at least one of the two plates has a thickness of between 2 and6 mm.

8. The grid according to claim 4 wherein at least one of the two plates has a thickness of between 2 and6 mm.

9. The grid according to claim 1 wherein at least one of the two plates is bonded to the anti-scatter layer.

10. The grid according to claim 2 wherein at least one of the two plates is bonded to the anti-scatter layer.

11. The grid according to claim 3 wherein at least one of the two plates is bonded to the anti-scatter layer.

12. The grid according to claim 4 wherein at least one of the two plates is bonded to the anti-scatter layer.

13. The grid according to claim 5 wherein at least one of the two plates is bonded to the anti-scatter layer.

14. The grid according to claim 6 wherein at least one of the two plates is bonded to the anti-scatter layer.

15. The grid according to claim 7 wherein at least one of the two plates is bonded to the anti-scatter layer.

16. The grid according to claim 8 wherein at least one of the two plates is bonded to the anti-scatter layer.

17. The grid according to claim 9 wherein the bonding is an adhesive arranged on a peripheral area of the anti-scatter layer.

18. The grid according to claim 9 wherein the bonding is an adhesive that forms a thin film extending over an entire surface of the anti-scatter layer.

19. The grid according to claim 18 wherein the adhesive is an aerosol adhesive sprayed to form a film.

20. The grid according to claim 18 wherein the adhesive is in film form.

21. The grid according to claim 1 wherein the two plates are of the same thickness.

22. The grid according to claim 1 further comprising:
a protection layer for one of the plates.

23. The grid according to claim 22 wherein the protection layer is a polymer material formed of a composite material containing carbon fibers, a lacquer, or a varnish.

24. The grid according to claim 22 wherein the protection layer has a thickness in the order of 0.1 mm.

25. The grid according to claim 22 wherein the protection layer is arranged on a surface of at least one of the two plates oriented in a direction opposite to a means for providing a source of radiation.

26. The grid according to claim 1 wherein the partitions form a plurality of focalized cells.

27. The grid according to claim 1 wherein the partitions form a plurality of cells, inner walls of the cells being coated with a layer that absorbs radiation.

28. The grid according to claim 1 wherein the grid is positioned within means for protecting the grid.

29. A method for fabricating an anti-scatter grid useful for X-ray imaging, comprising:

forming an anti-scatter layer having a plurality of partitions, the plurality of partitions defined by forming a polymer substrate with open cells therein and metallizing inner walls of the open cells with an X-ray absorbing metal layer;

disposing the anti-scatter layer such that a part of an incident X-ray passes through the anti-scatter layer via the polymer substrate, while another part of the X-ray passes through the anti-scatter layer via the open cells; and fixing at least one plate of expanded polymer material to at least one surface of the anti-scatter layer, thereby imparting a rigidity to the anti-scatter layer, the at least one plate having a low surface density that does not substantially attenuate an X-ray that passes therethrough, and having sufficient homogeneity so as not to disturb an X-ray image through artifacts;

wherein thickness of each of the at least one plate is equal to or greater than thickness of the anti-scatter layer, the at least one plate thickness being defined by a distance between two opposing plate surfaces of the at least one plate that are oriented such that an incident X-ray passes first through one of the surfaces and then through the other surface;

wherein the at least one plate consists of two plates of expanded polymer material arranged on opposing surfaces of the anti-scatter layer.

30. The method according to claim 29 wherein each of the two plates is bonded to the anti-scatter layer.

31. The method according to claim 29 further comprising:
forming a protection layer for at least one of the two plates.

32. The method according to claim 30 further comprising:
forming a protection layer for at least one of the two plates.

33. The method according claim 31 wherein the protection layer is arranged on a surface of at least one of the two plates oriented in a direction opposite to a means for providing a source of radiation.

34. The method according claim 32 wherein the protection layer is arranged on a surface of at least one of the two plates oriented in a direction opposite to a means for providing a source of radiation.

35. The method to claim 29 further comprising:
positioning the grid with means for protecting the grid.

36. An anti-scatter grid useful for X-ray imaging, comprising:
an anti-scatter layer having a plurality of partitions;
the anti-scatter layer comprising a polymer substrate with open cells formed therein, inner walls of the open cells comprising an X-ray absorbing metal layer, thereby defining the plurality of partitions;

the anti-scatter layer being disposed such that a part of an incident X-ray passes through the anti-scatter layer via the polymer substrate, while another part of the X-ray passes through the anti-scatter layer via the open cells;

at least one plate of expanded polymer material fixed to at least one surface of the anti-scatter grid, the at least one plate imparting a rigidity to the anti-scatter layer, having a low surface density that does not substantially attenuate an X-ray that passes therethrough, and having sufficient homogeneity so as not to disturb an X-ray image through artifacts;

a cross-piece positioned on one side of an assembly formed by the layer and the at least one plate;

respective U-shaped sections positioned on two opposite sides of the assembly; and a layer on another side of the assembly;

wherein the cross-piece, the sections, and the layer on another side form a frame in which the grid is positioned;

wherein thickness of each of the at least one plate is equal to or greater than thickness of the anti-scatter layer, each plate thickness being defined by a distance between two opposing plate surfaces of the respective plate that are oriented such that an incident X-ray passes first through one of the plate surfaces and then through the other plate surface; and wherein the at least one plate consists of two plates of expanded polymer material arranged on opposing surfaces of the anti-scatter layer.

37. An anti-scatter grid useful for X-ray imaging, comprising:

an anti-scatter layer having a plurality of partitions;

the anti-scatter layer comprising a polymer substrate with open cells formed therein, inner walls of the open cells comprising an X-ray absorbing metal layer, thereby defining the plurality of partitions;

the anti-scatter layer being disposed such that a part of an incident X-ray passes through the anti-scatter layer via the polymer substrate, while another part of the X-ray passes through the anti-scatter layer via the open cells;

at least one plate of expanded polymer material fixed to one surface of the anti-scatter grid, the at least one plate imparting a rigidity to the anti-scatter layer, having a low surface density that does not substantially attenuate an X-ray that passes therethrough, and having sufficient homogeneity so as not to disturb an X-ray image through artifacts; and a cross-piece positioned on one side of an assembly formed by the layer and the at least one plate;

wherein thickness of each of the at least one plate is equal to or greater than thickness of the anti-scatter layer, each the plate thickness being defined by a distance between two opposing plate surfaces of the respective plate that are oriented such that an incident X-ray passes first through one of the surfaces and then through the other plate surface; and wherein the at least one plate consists of two plates of expanded polymer material arranged on opposing surfaces of the anti-scatter layer.

38. An anti-scatter grid useful for X-ray imaging, comprising:

an anti-scatter layer having a plurality of partitions;

the anti-scatter layer comprising a polymer substrate with open cells formed therein, inner walls of the open cells comprising an X-ray absorbing metal layer, thereby defining the plurality of partitions;

the anti-scatter layer being disposed such that a part of an incident X-ray passes through the anti-scatter layer via the polymer substrate, while another part of the X-ray passes through the anti-scatter layer via the open cells;

at least one plate of expanded polymer material fixed to at least one surface of the anti-scatter grid, the at least one plate imparting a rigidity to the anti-scatter layer, having a low surface density that does not substantially attenuate an X-ray that passes therethrough, and having sufficient homogeneity so as not to disturb an X-ray image through artifacts; and means for protecting an assembly formed by the layer and the plate;

wherein thickness of each of the at least one plate is equal to or greater than thickness of the anti-scatter layer, each plate thickness being defined by a distance between two opposing surfaces of the respective plate that are oriented such that an incident X-ray passes first through one of the plate surfaces and then through the other surface; and wherein the at least one plate consists of two plates of expanded polymer material arranged on opposing surfaces of the anti-scatter layer.

* * * * *